US010787619B2

(12) United States Patent
Subramaniyam

(10) Patent No.: US 10,787,619 B2
(45) Date of Patent: Sep. 29, 2020

(54) EFFECTIVE NOVEL POLYMERIC ADDITIVE FOR INHIBITING NAPTHENIC ACID CORROSION AND METHOD OF USING THE SAME

(75) Inventor: Mahesh Subramaniyam, Mumbai (IN)

(73) Assignee: Dorf Ketal Chemicals (India) Private Limited, Mumbai (IN)

( * ) Notice: Subject to any disclaimer, the term of this patent is extended or adjusted under 35 U.S.C. 154(b) by 0 days.

(21) Appl. No.: 13/061,045

(22) PCT Filed: Aug. 26, 2009

(86) PCT No.: PCT/IB2009/053736
§ 371 (c)(1), (2), (4) Date: Feb. 25, 2011

(87) PCT Pub. No.: WO2010/023628
PCT Pub. Date: Mar. 4, 2010

(65) Prior Publication Data
US 2011/0160405 A1    Jun. 30, 2011

(30) Foreign Application Priority Data

Aug. 26, 2008    (IN) .................. 1791/MUM/2008

(51) Int. Cl.
| C08G 75/02 | (2016.01) |
| C10G 75/02 | (2006.01) |
| C08F 8/14 | (2006.01) |
| C08F 8/40 | (2006.01) |

(52) U.S. Cl.
CPC ............... *C10G 75/02* (2013.01); *C08F 8/14* (2013.01); *C08F 8/40* (2013.01); *C08F 2810/40* (2013.01); *C10G 2300/1033* (2013.01); *C10G 2300/203* (2013.01); *C10G 2300/4075* (2013.01)

(58) Field of Classification Search
CPC .................................. C08F 8/40; C08F 10/10
USPC .......... 525/242, 285, 340, 387, 389.21, 396; 166/242.4, 902; 203/7; 208/47; 507/939
See application file for complete search history.

(56) References Cited

U.S. PATENT DOCUMENTS

| 1,872,091 A | 8/1932 | Mougey |
| 2,316,078 A | 4/1943 | Loane et al. |
| 2,316,087 A | 4/1943 | Gaynor et al. |
| 2,688,612 A | 9/1954 | Watson |
| 2,915,517 A | 12/1959 | Le Suer |
| 3,132,975 A | 5/1964 | Freud |
| 3,145,886 A | 8/1964 | Goodwin |
| 3,201,438 A | 8/1965 | Reed |
| 3,256,190 A | 6/1966 | Reed et al. |
| 3,260,622 A | 7/1966 | Le Suer |
| 3,281,359 A | 10/1966 | Oberender et al. |
| 3,324,032 A | 6/1967 | O'Halloran |
| 3,428,561 A | 2/1969 | Lesuer |
| 3,459,662 A | 8/1969 | Hu |
| 3,460,989 A | 8/1969 | Rusch |
| 3,489,682 A | 1/1970 | Lesuer |
| 3,531,394 A | 9/1970 | Koszman |
| 3,663,637 A | 5/1972 | Juhl et al. |
| 3,668,237 A * | 6/1972 | Cyba .............................. 546/186 |
| 3,904,535 A | 9/1975 | Gordon et al. |
| 3,909,447 A | 9/1975 | Redmore et al. |
| 4,024,049 A | 5/1977 | Shell et al. |
| 4,024,050 A | 5/1977 | Shell et al. |
| 4,105,540 A | 8/1978 | Weinland |
| 4,443,609 A | 4/1984 | Oude Alink et al. |
| 4,542,253 A | 9/1985 | Kaplan et al. |
| 4,578,178 A | 3/1986 | Forester |
| 4,600,518 A | 7/1986 | Ries et al. |
| 4,842,716 A | 6/1989 | Kaplan et al. |
| 4,906,391 A | 3/1990 | Andress |
| 4,927,561 A | 5/1990 | Forester |
| 4,941,994 A | 7/1990 | Zetlmeisl et al. |
| 5,182,013 A | 1/1993 | Petersen et al. |

(Continued)

FOREIGN PATENT DOCUMENTS

| EP | 0565285 B1 | 5/1997 |
| EP | 1063276 | * 12/2000 |

(Continued)

OTHER PUBLICATIONS

International Search Report dated Feb. 9, 2010, issued in PCT/IB2009/053736.
International Preliminary Report on Patentability, dated Oct. 18, 2010, issued in PCT/IB2009/053736.
Advisory Action dated Aug. 8, 2013 (4 pages), U.S. Appl. No. 12/677,791, filed Mar. 11, 2010.
Foreign communication from a related counterpart application—International Search Report and Written Opinion, PCT/IN2008/000586, dated Aug. 24, 2009, 6 pages.

(Continued)

*Primary Examiner* — Robert C Boyle
(74) *Attorney, Agent, or Firm* — Conley Rose, P.C.; Rodney B. Carroll

(57) ABSTRACT

The present invention relates to the field of inhibition of metal corrosion in hot acidic hydrocarbons, wherein acidity is derived from presence of naphthenic acid. More particularly, it relates to a polymeric additive for inhibiting high temperature napthenic acid corrosion, wherein said polymeric additive is polymeric phosphate ester of polyisobutylene succinate ester or oxide derivative of polymeric phosphate ester of polyisobutylene succinate ester. A polymeric phosphate ester of polyisobutylene succinate ester which is capable of acting as naphthenic acid corrosion inhibitor by inhibiting naphthenic acid corrosion in crude oil/feedstock/hydrocarbon streams containing naphthenic acid, and demonstrating higher thermal stability at elevated temperature varying from about 200° C. to about 400° C. [about 400° F. to about 750° F.] is disclosed.

24 Claims, No Drawings

(56) References Cited

U.S. PATENT DOCUMENTS

| | | | |
|---|---|---|---|
| 5,252,254 | A | 10/1993 | Babaian-Kibala |
| 5,314,643 | A | 5/1994 | Edmondson et al. |
| 5,484,542 | A | 1/1996 | Cahoon et al. |
| 5,500,107 | A | 3/1996 | Edmondson |
| 5,552,085 | A | 9/1996 | Babaian-Kibala |
| 5,611,991 | A * | 3/1997 | Naraghi .................. 422/15 |
| 5,630,964 | A | 5/1997 | Babaian-Kibala et al. |
| 5,725,611 | A | 3/1998 | Wright et al. |
| 5,863,415 | A | 1/1999 | Zetlmiesl |
| 6,512,133 | B1 | 1/2003 | Goetzmann et al. |
| 7,122,508 | B2 | 10/2006 | Boffa |
| 2002/0107150 | A1 | 8/2002 | Mikami et al. |
| 2003/0201207 | A1 | 10/2003 | Eaton et al. |
| 2005/0044778 | A1 | 3/2005 | Orr |
| 2005/0234184 | A1* | 10/2005 | Doring et al. ............. 524/543 |
| 2007/0119747 | A1 | 5/2007 | Harrell et al. |
| 2010/0116718 | A1 | 5/2010 | Subramaniyam |
| 2010/0126842 | A1 | 5/2010 | Subramaniyam |
| 2010/0264064 | A1 | 10/2010 | Mahesh |
| 2011/0214980 | A1 | 9/2011 | Subramaniyam |

FOREIGN PATENT DOCUMENTS

| | | |
|---|---|---|
| GB | 8667 | 1/1907 |
| GB | 792553 | 3/1958 |
| WO | 2006049980 A2 | 5/2006 |
| WO | 2008005058 A1 | 1/2008 |
| WO | 2008120236 A2 | 10/2008 |
| WO | 2008120236 A3 | 10/2008 |
| WO | 2008122989 A2 | 10/2008 |
| WO | 2008122989 A3 | 10/2008 |
| WO | 2008122989 A4 | 10/2008 |
| WO | 2009063496 A2 | 5/2009 |
| WO | 2009063496 A3 | 5/2009 |
| WO | 2010023621 A2 | 3/2010 |
| WO | 2010023621 A3 | 3/2010 |
| WO | 2010023628 A1 | 3/2010 |

OTHER PUBLICATIONS

Foreign communication from a related counterpart application—International Preliminary Report on Patentability, PCT/IN2008/000586, dated Mar. 16, 2010, 5 pages.

Foreign communication from a related counterpart application—International Search Report and Written Opinion, PCT/IB2009/053736, dated Feb. 9, 2010, 11 pages.

Foreign communication from a related counterpart application—International Search Report and Written Opinion, PCT/IB2009/053726, dated Jun. 17, 2010, 15 pages.

Foreign communication from a related counterpart application—International Preliminary Report on Patentability, PCT/IB2009/053726, dated Dec. 7, 2010, 14 pages.

Foreign communication from a related counterpart application—International Search Report and Written Opinion, PCT/IN 2008/000217, dated Mar. 23, 2009, 8 pages.

Foreign communication from a related counterpart application—International Preliminary Report on Patentability, PCT/IN2008/000217, dated Oct. 6, 2009, 7 pages.

Foreign communication from a related counterpart application—International Search Report and Written Opinion, PCT/IN2008/000195, dated Mar. 25, 2009, 7 pages.

Foreign communication from a related counterpart application—International Preliminary Report on Patentability, PCT/IN2008/000195, dated Oct. 6, 2009, 6 pages.

Office Action dated Oct. 11, 2013 (17 pages), U.S. Appl. No. 12/593,622, filed Sep. 29, 2009.

Office Action (Final) dated Mar. 19, 2013 (16 pages), U.S. Appl. No. 12/593,622, filed Sep. 29, 2009.

Office Action dated Jul. 23, 2012 (16 pages), U.S. Appl. No. 12/593,622, filed Sep. 29, 2009.

Office Action (Restriction Requirement) dated May 2, 2012 (7 pages), U.S. Appl. No. 12/593,622, filed Sep. 29, 2009.

Office Action (Final) dated May 13, 2013 (12 pages), U.S. Appl. No. 12/594,320, filed Oct. 1, 2009.

Office Action dated Aug. 13, 2012 (15 pages), U.S. Appl. No. 12/594,320, filed Oct. 1, 2009.

Office Action (Restriction Requirement) dated Mar. 8, 2012 (9 pages), U.S. Appl. No. 12/594,320, filed Oct. 1, 2009.

Office Action (Final) dated May 23, 2013 (12 pages), U.S. Appl. No. 12/677,791, filed Mar. 11, 2010.

Office Action dated Nov. 15, 2012 (14 pages), U.S. Appl. No. 12/677,791, filed Mar. 11, 2010.

Office Action (Restriction Requirement) dated Jul. 26, 2012 (6 pages), U.S. Appl. No. 12/677,791, filed Mar. 11, 2010.

Abou El Naga, H. H., et al., "Succinimide Phosphoric Acid Esters as Multipurpose Additives," XP002565966, Lubrication Science, Jul. 1994, pp. 351-361, vol. 6, No. 4.

Office Action (Final) dated May 22, 2014 (24 pages), U.S. Appl. No. 12/593,622, filed Sep. 29, 2009.

Foreign communication from a related counterpart application—Intention to Grant, European Patent Application No. 09787015.8, dated Mar. 27, 2014, 48 pages.

Office Action (Restriction Requirement) dated Jun. 4, 2014 (8 pages), U.S. Appl. No. 13/060,819, filed May 18, 2011.

Office Action dated Oct. 1, 2014 (26 pages), U.S. Appl. No. 13/060,819, filed May 18, 2011.

Office Action (Final) dated Jul. 10, 2015 (10 pages), U.S. Appl. No. 13/060,819, filed May 18, 2011.

Office Action dated Mar. 21, 2016 (11 pages), U.S. Appl. No. 13/060,819, filed May 18, 2011.

Notice of Allowance dated Jun. 5, 2017 (8 pages), U.S. Appl. No. 15/244,688, filed Aug. 23, 2016.

Office Action (Final) dated Sep. 9, 2016 (12 pages), U.S. Appl. No. 13/060,819, filed May 18, 2011.

Office Action dated Mar. 31, 2017 (16 pages), U.S. Appl. No. 13/060,819, filed May 18, 2011.

Notice of Allowance dated Dec. 8, 2017 (10 pages), U.S. Appl. No. 13/060,819 filed May 18, 2011.

* cited by examiner

EFFECTIVE NOVEL POLYMERIC ADDITIVE FOR INHIBITING NAPTHENIC ACID CORROSION AND METHOD OF USING THE SAME

CROSS-REFERENCE TO RELATED APPLICATIONS

This application is a U.S. national phase application filed under 35 U.S.C. § 371 of International Application No. PCT/IB2009/053736, filed Aug. 26, 2009, designating the United States, which claims priority from Indian Patent Application No.: 1791/MUM/2008, filed Aug. 26, 2008, which are hereby incorporated herein by reference in their entirety for all purposes.

FIELD OF THE INVENTION

The present invention relates to the field of inhibition of metal corrosion in hot acidic hydrocarbons, wherein acidity is derived from presence of naphthenic acid.

Particularly, the present invention relates to polymeric additive for inhibiting high temperature napthenic acid corrosion and to method of using proposed polymeric additive to inhibit napthenic acid corrosion.

More particularly, it relates to a polymeric additive for inhibiting high temperature napthenic acid corrosion, wherein said polymeric additive is polymeric phosphate ester of polyisobutylene succinate ester or oxide derivative of polymeric phosphate ester of polyisobutylene succinate ester.

BACKGROUND OF THE INVENTION

It is widely known in the art that the processing of crude oil and its various fractions has led to damage to piping and other associated equipment due to naphthenic acid corrosion. These are corrosive to the equipment used to distill, extract, transport and process the crudes.

The difficulty observed in solving problems of naphthenic acid corrosion is that it is primarily difficult to access its concentration in the crude oil, which is now estimated as Total Acid Number (TAN) or Neutralization Number. Generally speaking, naphthenic acid corrosion occurs when the crude being processed has a neutralization number or total acid number (TAN), expressed as the milligrams of potassium hydroxide required to neutralize the acids in a one gram sample, above 0.2.

As commonly used, naphthenic acid is a collective term for certain organic acids, which predominantly consists of monocyclic or bicyclic carboxylic acids with a boiling range between 350° and 650° F., and present in various crude oils. Although there may be present minor amounts of other organic acids, it is understood that the majority of the acids in naphthenic based crude are naphthenic in character, i.e., with a saturated ring structure as follows:

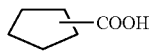

The acids tend to concentrate in the heavier fractions during crude distillation at various locations including furnace tubing, transfer lines, fractionating tower internals, feed and reflux sections of columns, heat exchangers, tray bottoms and condensers, and corrode such locations of the column.

The molecular weight of naphthenic acid can extend over a large range. However, the majority of the naphthenic acid from crude oils is found in gas oil and light lubricating oil. The corrosive behaviour and physical properties of napthenic acid vary with changes in molecular weight and source of crude oil. Therefore, the corrosion inhibitor suitable for one type of crude oil containing naphthenic acid may not be suitable for another type of crude oil containing naphthenic acid.

Further, the corrosivity of naphthenic acids is reported to be exceptionally serious in the presence of sulfide compounds, such as hydrogen sulfide, mercaptans, elemental sulfur, sulfides, disulfides, polysulfides and thiophenols. The naphthenic acid corrosion has also been reported to occur in carbon steel or ferritic steel furnace tubes and tower bottoms. The alloys employing from 1.25% Cr to 12% Cr, or perhaps even higher amounts unfortunately show little to no resistance to naphthenic acid corrosion. Austenitic stainless steel containing at least 2.5% molybdenum is proposed to compensate corroding effects of sulfur and naphthenic acid, which does not appear to be cost effective [U.S. Pat. No. 5,630,964].

It is also known that when naphthenic acid-containing hydrocarbons/crude oils/feedstocks is at a temperature between about 200° C. and 400° C. (approximately 400° F.-750° F.), the corrosive action of naphthenic acid is severe. The naphthenic acid corrosion does take place at lower temperature, but the corrosion in the temperature range varying from about 200° C. to 400° C. is severe, and therefore, has drawn more attention.

Corrosion problems associated with naphthenic acid constituents and sulfur compounds in crude oils and petroleum refining operations have been recognized for many years. As stated, such corrosion is particularly severe in atmospheric and vacuum distillation units at temperatures range varying from about 400° F. to about 750° F., which confirms that the naphthenic acid corrosion is highly temperature dependent.

It has been observed that at elevated temperatures, the corrosion inhibitors demonstrate poor thermal stability, and get decompose and deposited on surfaces of the reactor/distillation unit, and thereby cause fouling problem. Therefore, the corrosion inhibitor which is thermally stable at elevated temperatures and does not get decompose and deposited at surfaces of the reactor/distillation unit will the ideal choice of the industry.

Other factors that contribute to corrosion activity of naphthenic acid present in the crude oils or feedstock to be treated include:— a) the amount of naphthenic acid present in the crude oil or feedstock to be treated;
b) the concentration of sulfur compounds present in the crude oil or feedstock to be treated;
c) the phosphorus contents present in the crude oil or feedstock to be treated and in the corrosion inhibitor employed to inhibit the corrosion; and
d) the acidity of the crude oil or feedstock to be treated, and of the corrosion inhibitor employed to inhibit the corrosion.

The concentrations of naphthenic acid and sulfur compounds present in the crude oil/feedstocks/hydrocarbon streams [stream], generally, cannot be controlled, therefore, whichever corrosion inhibitor is to be used to inhibit the naphthenic acid corrosion it should be capable of controlling the corrosion of that amounts of naphthenic acid and sulfur compounds present in the stream. Generally, these aspects are taken care by employing sufficient amount of the corrosion inhibitor. However, one will not prefer the inhibitor if its higher amounts cause other disadvantages as in case of phosphorus containing inhibitors described hereinbelow.

Further, the naphthenic acid corrosion gets exceptionally severe in the presence of sulfur compounds, especially hydrogen sulfide.

Therefore, the ideal corrosion inhibitor will be the one which can be effective for possible concentrations of naphthenic acid as well as sulfur compounds. If its higher amount is to be employed, then it should not cause other associated disadvantages.

The phosphorus content of the crude oil or feedstock to be treated and of the corrosion inhibitor is known to impair the function of various catalysts or tend to poison the catalysts which are used to treat the crude oil/feedstock/hydrocarbon streams, e.g., in fixed-bed hydrotreaters and hydrocracking units. This problem, therefore, is more severe when higher amounts of phosphorus containing corrosion inhibitor are to be employed to counter higher concentrations of naphthenic acid. The crude oil processors, therefore, are always in dilemma to use the phosphorus containing inhibitors, because associated problems thereto may render the over-all process ineffective and commercially unviable.

The problems of phosphorus containing corrosion inhibitors may be overcome, but by employing additional compounds known as phosphite stabilizers. However, use of additional stabilizers may also render the over-all process commercially unviable.

Another solution to problem of phosphorus containing inhibitors is to employ non-phosphorus corrosion inhibitors. However, it has been found that these inhibitors are, generally, less effective as compared to phosphorus containing inhibitors, and therefore, are not preferred choice.

Therefore, the ideal corrosion inhibitor will be the one which comprises lower, but still effective amounts of phosphorus.

The acidity of crude oil/feedstocks/hydrocarbon streams [stream] to be treated is primarily due to presence of naphthenic acid and of sulfur compounds, and minor amounts of organic acids. As stated above the concentration of these compounds, generally, cannot be reduced in the stream ready for treatment. However, some times the acidity of the stream is controlled either by blending the higher acid numbered oils with low acid numbered oils so that overall acid number of the stream to be treated is lowered down, or by neutralizing acidic contents of the stream to be treated by a suitable neutralizing agent, or by removing the acidic contents from the stream by suitable methods. It may be noted that such methods not only increase the processing time, but also increase the processing cost, and therefore, make the process highly undesirable for commercial purpose, and therefore, such remedies are not the preferred one.

Therefore, if the corrosion inhibitor per se, like aliphatic or aromatic phosphate esters has higher acidity, then they tend to react with metallic surface of the reactor and form salts thereof, like phosphate salts from aliphatic or aromatic phosphate esters, which sometimes get deposited and thereby cause fouling. Thus, such inhibitors having higher acidity have serious problems and therefore, cannot be employed as naphthenic acid corrosion inhibitors, or at least cannot be considered as preferred choice of the industry.

In view of the foregoing description, naphthenic acid corrosion, therefore, is a concern for the researchers in the field and attempts are still on to find a suitable corrosion inhibitor which can not only be effective at elevated temperature, particularly within the temperature range varying from about from about 200° C. to 400° C. [about 400° F. to about 750° F.], but also demonstrates higher thermally stability at elevated temperatures, and does not get decomposed and deposited at surfaces of the reactor/distillation unit.

Further, the corrosion inhibitor developed should be effective for possible concentrations of naphthenic acid and sulfur compounds in the stream that's too without causing associated disadvantages; and may comprise lower, but effective amounts of phosphorus; and it per se should have lower acidity or at least should not contribute to acidity of the stream to be treated so that the inhibitor developed can be the preferred choice of the industry.

For the present inventor, need of suitable corrosion inhibitor having above advantages arises particularly to treat Indian crude oil. However, the present invention not only aims to develop a corrosion inhibitor to treat the Indian crude oil, but also to treat crude oil of countries like China, Africa and Europe, which have also been found to contain varying amounts of naphthenic acid.

Various approaches to control naphthenic acid corrosion including, as stated above, blending the crude oil having low acid numbers with crude oil having high acid number so that overall acid number [neutralization number] is reduced, have been tried. However, blending has not been reported to be successful in preventing naphthenic acid corrosion.

Another approach, as stated, includes neutralization and/or removal of the naphthenic acids from the crude oil being processed, wherein crude oil is treated with choline [U.S. Pat. No. 4,600,518]. Even this approach has not been found to be effective to combat naphthenic acid corrosion which is severe at higher temperatures and more serious in presence of sulphur.

The use of tetrahydrothiazole phosphonic acids and esters thereof as scale inhibitors, as acid corrosion inhibitors, and general corrosion inhibitors or as biocides has been reported in U.S. Pat. No. 4,443,609. The US'609 also reports that tetrahydrothiazole phosphonic acids and esters thereof may be employed as intermediates leading to scale inhibitors upon reacting with formaldehyde/phosphorus acid. As per US '609, such inhibitors can be prepared by reacting certain 2,5-dihydrothiazoles with a dialkyl phosphite. These inhibitors may be having good corrosion inhibition properties, but these tend to break down during high temperature applications with possible emission of obnoxious and toxic substances, therefore, are not preferred choice of the industry.

The U.S. Pat. No. 5,182,013 discloses use of organic polysulfides as potential corrosion inhibitors to inhibit naphthenic acid corrosion. However, organic polysulfides are reported to be suitable only upto the temperatures of 500° F. The inventor of present invention believes such limitation of organic polysulfides is because of their poor thermal stability.

The U.S. Pat. No. 5,630,964 tries to overcome limitations of U.S. Pat. No. 5,182,013 by deliberate addition of sulfiding agents to the process stream containing phosphorus, because as per US'964, phosphorus can form an effective barrier against corrosion without sulphur, but the addition of sulfiding agents to the process stream containing phosphorus yields a film composed of both sulfides and phosphates, which is said to improve performance of the additive consisting of mixture of phosphate ester and organic polysulfide.

Further, US'964 demonstrates [Table II of Example 2] that if one attempts to inhibit naphthenic acid corrosion either by employing phosphate ester alone or by employing polysulfide alone, the corrosive activity is inhibited but not eliminated meaning thereby phosphate ester alone or polysulfide alone are not effective to inhibit and eliminate the naphthenic acid corrosive activity.

Further, US'964 also goes to demonstrate [Table II of Example 2] that if one attempts to inhibit naphthenic acid corrosion by employing mixture of phosphate ester and organic polysulfide, the corrosive activity is inhibited as well as eliminated, meaning thereby, as per US'964, one can achieve efficiency of phosphate ester corrosion inhibitor only by combining it with organic polysulfide and not otherwise.

Accordingly, it is understood from the foregoing that as per US'013, organic polysulfide is effective as naphthenic acid corrosion inhibitor, but only upto the temperatures of 500° F., which means it cannot be employed in the higher temperature range. However, as per US'964, neither phosphate ester alone nor organic polysulfide alone is very effective, but only their combination is effective as naphthenic acid corrosion inhibitor. Therefore, after reading of US'964, one will not make attempt to employ either phosphate ester alone or organic polysulfide alone.

The combination of thiophosphorus compound with hydrogen sulfide scavenging compound is reported in US Patent publication No. 2007/0119747. As per this patent, if one attempts to control the naphthenic acid corrosion, by employing only the thiophosphorus compound, the level of protection achieved is very low varying upto 89% [Example 2]. However, when one also adds hydrogen sulfide scavenging compound to the thiophosphorus compound, the level of protection is determined to be 99.7% [Example 1]. Therefore, after reading of US'747, one will not make attempt to employ only thiophosphorus compound.

Similarly, U.S. Pat. No. 3,909,447 discloses use of combination of thiophosphates, pyrophosphates containing both oxygen and sulfur, and oxygen phosphates as corrosion inhibitor. This patent [see abstract and claim 1] also confirms that when one attempts to inhibit corrosion by employing either of thiophosphates or of pyrophosphates containing both oxygen and sulfur, or of oxygen phosphates, the results are not encouraging. Therefore, even from reading of US'447, one will not attempt to use thiophosphates, pyrophosphates containing both oxygen and sulfur, and oxygen phosphates individually.

Further, the corrosion inhibitors of US'447 are useful against corrosion in relatively low temperature oxygenated aqueous systems such as water floods, cooling towers, drilling muds, air drilling and auto radiator systems. US'447 also notes that many corrosion inhibitors capable of performing in non-aqueous systems and/or non-oxygenated systems perform poorly in aqueous and/or oxygenated systems. Further, the reverse is true as well. The mere fact that an inhibitor that has shown efficacy in oxygenated aqueous systems does not suggest that it would also show efficacy in a hydrocarbon. Moreover, the mere fact that an inhibitor has been efficacious at relatively low temperatures does not mean that it would also be efficacious at elevated temperatures.

In fact, it is common for inhibitors that which are very effective at relatively low temperatures have been found to become ineffective at temperatures such as the 175° C. to 400° C. encountered in oil refining. At such temperatures, corrosion is notoriously troublesome and difficult to alleviate.

Further, the inventor of present invention has found that the thiophosphates, pyrophosphates containing both oxygen and sulfur, and oxygen phosphates will have higher acidity which is not desirable to control naphthenic acid corrosion.

Therefore, U.S.'447 contains no teaching or suggestion that individually thiophosphates, pyrophosphates containing both oxygen and sulfur, and oxygen phosphates will be effective as corrosion inhibitor in non-aqueous systems such as hydrocarbon fluids, especially hot hydrocarbon fluids. Further, there is no teaching that individually thiophosphates, pyrophosphates containing both oxygen and sulfur, and oxygen phosphates would be effective against naphthenic acid corrosion at elevated temperature.

The combination of phosphate ester with phosphite mono- and di-esters is reported in U.S. Pat. No. 4,024,050 and combination of thio-phosphate ester with thio-phosphite mono- and di-esters is reported in U.S. Pat. No. 4,024,049. However, these combinations are reported only as anti-fouling agents. Further, phosphate esters employed are aliphatic of lower alkyls, which cannot have molecular weight between from about 850 to 1600. The inventor of present invention has found that these compounds have poor thermal stability, and tendency to decompose and get deposited on metallic surfaces of the reactor, and have high phosphorus content, high acidity, and therefore, cannot be effective as naphthenic acid corrosion inhibitors.

The U.S. Pat. No. 5,552,085 discloses use of phosphorus thioacid hydrocarbyl ester to control corrosion on metallic surface of distillation column used for treating hydrocarbons containing naphthenic acid. The phosphorus thioacid hydrocarbyl ester employed comprises alkyl having from 5 to 30 carbon atoms, which cannot have molecular weight between from about 850 to 1600. The inventor of present invention has found that these compounds also have poor thermal stability, and tendency to decompose and get deposited on metallic surfaces of the reactor, and have high phosphorus content, high acidity, and therefore, cannot be effective as naphthenic acid corrosion inhibitors.

The use of phosphite esters, phosphate esters, thiophosphite esters, thiophosphate esters and mixtures thereof is disclosed in U.S. Pat. No. 4,542,253.

The U.S. Pat. No. 5,863,415 discloses use of one or more thiophosphorus compound, a salt thereof, an alkyl or aryl ester thereof, an isomer thereof or mixture thereof.

Even findings of US'964 [and also of US'447], without explaining the reasons, also goes to confirm that when phosphate ester is employed alone as naphthenic acid corrosion inhibitor, its corrosive activity is not effective, that is, not of desired level to inhibit as well as eliminate the corrosive activity of naphthenic acid. Therefore, even US'049, US'050 and US'085 cannot be considered to disclose or suggest or teach use of phosphate esters as naphthenic acid corrosion inhibitor at elevated temperature during crude oil processing.

The use of phosphorus containing compounds has been reported in U.S. Pat. No. 3,531,394, but only as thermally cracking agents. Further, the phosphorus containing compounds are selected from oxide of phosphorus, phosphoric acid or phosphine. This patent also discloses use of bismuth containing compounds, and of combination of phosphorus containing and bismuth containing compounds, but only as thermally cracking agents. The use of phosphates is indicated, but only as thermally cracking agents, and in combination with bismuth containing compounds.

The use of phosphorus compound selected from phosphate, phosphite, thiophosphate or thiophosphite ester compounds with filming inhibitor-imidazoline compound has also been disclosed in U.S. Pat. No. 4,842,716.

A significant advancement in phosphorus-containing naphthenic acid corrosion inhibitors has been reported in U.S. Pat. No. 4,941,994. Therein it is disclosed that metal corrosion in hot acidic liquid hydrocarbons is inhibited by the presence of a corrosion inhibiting amount of a dialkyl and/or trialkyl phosphite with an optional thiazoline. While the method described in U.S.'994 may be capable of providing significant improvements over the prior art techniques, nevertheless, there is always a desire to enhance the ability of corrosion inhibitors while reducing the amount of phosphorus-containing compounds which, as described herein, are know to impair function of various catalysts used for treatment of crude oil, as well as a desire for such inhibitors that may be produced from lower cost or more available starting materials.

As described herein, the use of phosphorus based compounds particularly, when these are to be employed in higher amounts, can cause impairing of catalyst activity or poising of catalyst. The PCT publication WO 2008/005058 proposes a solution to this problem by either reducing the amount of phosphorus-based constituents or by eliminating the use of phosphorus based constituents. However, this application additionally proposes use of sulfur-based constituents which are selected from tropylene, 1,2,4-dithiazole-3-thione, and combination thereof, and nitrogen-based constituents which are selected from acridine, phenanthridine, octahydroacridine, octahydrophenanthridine, 1,3-thiazole, and combinations thereof. The main problem, in addition to general problems of sulfur-based constituents, is that the suggested sulfur compounds are expensive, therefore, the process is not economically viable.

The US patent publication No. US 2003/0201207 discloses use of a treating agent comprising at least one overbase complex of a metal salt and an organic acid complexing agent, which as per this publication should form a colloidal dispersion in the hydrocarbon stream containing naphthenic acid. Here again it is the combination of two compounds and that's too capable of forming a complex and then forming a colloidal dispersion with hydrocarbon stream. This publication also does not disclose or teach phosphate esters which can be effective at elevated temperature and demonstrate higher thermal stability and low acidity.

Another approach for prevention of naphthenic acid corrosion is use of a chemical agent to form a barrier between the crude and the equipment of the hydrocarbon processing unit. This barrier or film prevents corrosive agents from reaching the metal surface, and is generally a hydrophobic material. Gustaysen et al. NACE Corrosion 89 meeting, paper no. 449, Apr. 17-21, 1989 details the requirements for a good filming agent. Further, U.S. Pat. No. 5,252,254 discloses one such film forming agent consisting of sulfonated alkylphenol, which as per this patent is effective against naphthenic acid corrosion. As this is aliphatic in nature and its molecular weight is likely to be very low, it is expected to be thermally less stable at elevated temperatures.

The PCT publication No. WO2006/049980 discloses use of tetra functional substituted aromatic compounds and esters or anhydrides of trimellitic acid, which can be employed even if crude oil/feedstock/hydrocarbon stream contains sulfur containing compounds. The proposed additives are non-polymeric in nature and the non-polymeric additives tend to break down at elevated temperature conditions resulting in formation of volatile products which tend to contaminate the hydrocarbon stream. Further, the non-polymeric compounds have poor efficiencies.

While various corrosion inhibitors have been known in art and some of which have been described herein. The efficacy and usefulness of any particular corrosion inhibitor is known to dependent on particular circumstances in which it is applied. Therefore, efficacy and usefulness under one set of circumstances often does not imply same for another set of circumstances. As a result, a large number of corrosion inhibitors have been developed and are in use for application to various systems depending on the medium treated, the type of surface that is susceptible to the corrosion, the type of corrosion encountered, and the conditions to which the medium is exposed, and still developmental work is going on to find better alternatives.

It is observed that currently used inhibitors are, generally, thermally reactive at elevated temperatures. In case of phosphorus-based inhibitors, this is thought to lead to a metal phosphate surface film, which is more resistant to naphthenic acid corrosion than the base steel. These inhibitors are relatively volatile and exhibit fairly narrow distillation ranges.

Further, the polysulfide based inhibitors decompose into complex mixtures of higher and lower polysulfides, and, perhaps, elemental sulfur and mercaptans. Therefore, their volatility and protection offered is not predictable.

Problem to be Solved by the Invention

Accordingly, it is understood from the foregoing description that present problem faced by the industry is that none of the additives of the prior art can be considered as preferred choice to inhibit naphthenic acid corrosion at elevated temperature in crude oil/hydrocarbon/feedstock distillation/reactor column, because these have one or the other problem as described herein.

Need of the Invention

Therefore, there is a need to have a naphthenic acid corrosion inhibitor, which can not only be effective at elevated temperature varying from about from about 200° C. to 400° C. [about 400° F. to about 750° F.], but can also demonstrate higher thermal stability at elevated temperatures, and therefore, does not get decomposed and deposited at metallic surfaces of the reactor/distillation unit, meaning thereby does not cause fouling and other associated problems so that Indian crude oil, and crude oil from countries like China, Africa and Europe can be effectively treated without causing corrosion due to presence of naphthenic acid therein.

Further, the corrosion inhibitor so developed should also be effective for possible concentrations of naphthenic acid in the stream that's too without causing associated disadvantages, and it should have lower acidity or at least should not contribute to acidity of the stream to be treated so that the inhibitor developed can be the preferred choice of the industry.

Further, the corrosion inhibitor so developed may comprise lower, but effective amounts of phosphorus.

Objects and Advantages of the Invention

Accordingly, there remains a continuing need to develop additional options for mitigating the corrosivity of acidic crudes effectively and at lower cost. This is especially true at times of low refining margins and a high availability of corrosive crudes from sources such as India, Europe, China, and Africa. The present invention aims to addresses this need.

Therefore, main object of the present invention is to provide a naphthenic acid corrosion inhibitor, which is not only effective at elevated temperature varying from about from about 200° C. to 400° C. [about 400° F. to about 750° F.], but also demonstrate higher thermal stability at elevated temperatures, and therefore, does not get decomposed and deposited at metallic surfaces of the reactor/distillation unit, meaning thereby does not cause fouling and other associated problems.

This is also an object of the present invention to provide a naphthenic acid corrosion inhibitor, which is also effective for higher concentrations of naphthenic acid in the stream that's too without causing associated disadvantages.

This is also an object of the present invention to provide a naphthenic acid corrosion inhibitor, which, if employed in higher amount, does not cause other associated disadvantages.

This is also an object of the present invention to provide a naphthenic acid corrosion inhibitor, which has lower acidity or at least does not contribute to acidity of the stream to be treated, and therefore, does not tend to react with metallic surface of the reactor, and hence, does not form salts of acids/esters, meaning thereby does not cause fouling.

This is also an object of the present invention to provide a naphthenic acid corrosion inhibitor, which comprises lower, but effective amounts of phosphorus, and hence, does not impair function of catalysts or does not poison the catalysts employed for treatment of the crude oil/feedstock/hydrocarbon streams.

This is also an object of the present invention to provide a naphthenic acid corrosion inhibitor, which is not non-polymeric additive, but a polymeric additive, and has been found to be stable at elevated temperatures, and does not tend to break down, and therefore, does not result in formation of volatile products, meaning thereby does not contaminate the feedstock/hydrocarbon stream.

This is also an object of the present invention to provide a naphthenic acid corrosion inhibitor which is capable of treating Indian crude oil, and crude oil from countries like China, Africa and Europe by inhibiting the corrosion caused due to presence of naphthenic acid.

This is also an object of the present invention to provide a naphthenic acid corrosion inhibitor, the use of which does not render the over-all process ineffective and commercially unviable.

This is also an object of the present invention to provide a naphthenic acid corrosion inhibitor, which is not required to be employed in combination with any other corrosion inhibitor including non-phosphorus corrosion inhibitors and/ or additional stabilizers.

This is also an object of the present invention to provide a naphthenic acid corrosion inhibitor, which is capable of inhibiting and eliminating corrosive activity of naphthenic acid.

This is also an object of the present invention to provide a naphthenic acid corrosion inhibitor, which due to its polymeric nature has substantially higher molecular weight varying from about 800 to 10000, more preferably 800-1600.

This is also an object of the present invention to provide a naphthenic acid corrosion inhibitor, which when employed to inhibit naphthenic acid corrosion does not emit obnoxious and toxic substances.

Other objects and advantages of the present invention will become more apparent when the following description is read in conjunction with the accompanying examples.

BRIEF SUMMARY OF THE INVENTION

The present invention relates to the field of inhibition of metal corrosion in hot acidic hydrocarbons, wherein acidity is derived from presence of naphthenic acid. More particularly, it relates to a polymeric additive for inhibiting high temperature napthenic acid corrosion, wherein said polymeric additive is polymeric phosphate ester of polyisobutylene succinate ester or oxide derivative of polymeric phosphate ester of polyisobutylene succinate ester. A polymeric phosphate ester of polyisobutylene succinate ester which is capable of acting as naphthenic acid corrosion inhibitor by inhibiting naphthenic acid corrosion in crude oil/feedstock/hydrocarbon streams containing naphthenic acid, and demonstrating higher thermal stability at elevated temperature varying from about 200° C. to about 400° C. [about 400° F. to about 750° F.] is disclosed

DESCRIPTION AND PREFERRED EMBODIMENTS OF THE INVENTION

With aim to overcome one or more of above-described problems of the prior art, the inventor of present invention has found that when a polymeric additive selected from polymeric phosphate ester of polyisobutylene succinate ester and oxide derivative of polymeric phosphate ester of polyisobutylene succinate ester is employed as naphthenic acid corrosion inhibitor, the corrosive activity of crude oil/feedstock/hydrocarbon stream containing naphthenic acid is surprisingly reduced, inhibited and eliminated, and level of protection [corrosion inhibition efficiency] afforded by employing polymeric corrosion inhibitor of present invention has been found to be about 99% at elevated temperature and that's too with lower amounts of about 300 ppm, which surprisingly has also been found to have substantially higher thermal stability and lower acidity and lower phosphorus contents, and therefore, has been found to avoid disadvantages associated with lower thermal stability, higher acidity and higher phosphorus contents. Further, the polymeric corrosion inhibitor of present invention surprisingly does not decompose, and therefore, does not producing the deposits.

Accordingly, in one embodiment, the present invention relates to a polymeric additive which is polymeric phosphate ester of polyisobutylene succinate ester capable of inhibiting naphthenic acid corrosion and demonstrating higher thermal stability at elevated temperature varying from about 200° C. to about 400° C. [about 400° F. to about 750° F.], by reducing, inhibiting the corrosive activity of crude oil/ feedstock/hydrocarbon stream containing naphthenic acid.

In accordance with present invention, the polymeric phosphate esters of polyisobutylene succinate ester is selected from polymeric phosphate esters having one of the following structures I, II or III:—

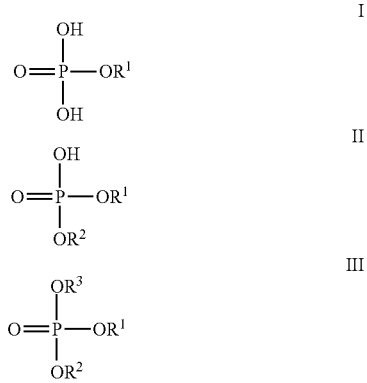

wherein $R^1$, $R^2$ and $R^3$ are hydroxy terminated polyisobutylene succinate ester having molecular weight varying from about 800-10,000 deltons.

Accordingly, in one embodiment, the present invention relates to a polymeric additive which is oxide derivative of polymeric phosphate ester of polyisobutylene succinate ester capable of inhibiting naphthenic acid corrosion and demonstrating higher thermal stability at elevated temperature varying from about 200° C. to about 400° C. [about 400° F. to about 750° F.], by reducing, inhibiting and eliminating the corrosive activity of crude oil/feedstock/hydrocarbon stream containing naphthenic acid.

In accordance with present invention, the oxide derivatives of polymeric phosphate esters of polyisobutylene succinate ester is selected from polymeric phosphate esters having one of the following structures A or B:—

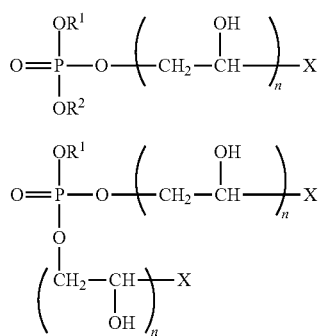

wherein $R^1$ and $R^2$ are hydroxy terminated polyisobutylene succinate ester having molecular weight varying from about 800-10,000 delton;
X is H, $CH_3$ or $C_2H_5$; and
n may vary from 1 to 20.

It has been found that polymeric additives of present invention are capable of demonstrating substantially higher thermal stability of about 50% weight loss as determined by thermogravimetric analysis in a temperature range varying from about 350° C. to about 400° C., and have lower acidity varying from about 1 mg KOH/gm to about 80 mg KOH/gm as determined by titration of samples against normal alcoholic KOH samples and lower phosphorus contents varying from about 2% to about 5% of the additive, and therefore, are capable of avoiding disadvantages associated with lower thermal stability, higher acidity and higher phosphorus contents.

Further, it has been found that polymeric corrosion inhibitors of present invention surprisingly do not decompose, and therefore, do not produce the deposits in the stream and on the walls of the column.

The polymeric additives of present have been found to have substantially higher thermal stability, therefore, these do not get decomposed and deposited at metallic surfaces of the reactor/distillation unit, meaning thereby do not cause fouling and other associated problems.

In accordance with one embodiment of the present invention, the polymeric phosphate ester of polyisobutylene succinate ester of present invention is prepared by reacting polyisobutylene succinic anhydride [PIBSA] with a glycol to form hydroxy terminated polyisobutylene succinate ester, which is reacted with phosphorus pentoxide to result in polymeric phosphate ester of polyisobutylene succinate esters.

In accordance with present invention, the glycol is selected from mono-glycols, aliphatic glycols, aryl glycols, di-glycols, and aliphatic di-glycols, aryl di-glycols, particularly mono-glycols, aliphatic glycols, aryl glycols, more particularly ethylene glycol.

In accordance with present invention, the glycol and PIBSA are preferably taken in a mole ratio varying from about 1:04 to about 1:1 mole.

In accordance with present invention, the ratio of $P_2O_5$ to hydroxy-terminated PIB is preferably 0.01 to 4 mole of $P_2O_5$ to 1 mole of hydroxy-terminated PIB.

In accordance with present invention, the polyisobutylene succinic anhydride [PIBSA] may be prepared by reacting high reactive polyisobutylene with maleic anhydride by employing conventional process.

In accordance with present invention, the high reactive polyisobutylene is reacted with maleic anhydride after taking in a mole ratio varying from about 1:0.5 to about 1:1.

In accordance with one embodiment of the present invention, the oxide derivative of polymeric phosphate esters of polyisobutylene succinate ester of present invention is prepared by reacting polymeric phosphate esters of polyisobutylene succinate ester with oxirane compound to result in oxide derivatives of polymeric phosphate ester of polyisobutylene succinate ester.

In accordance with present invention, the oxirane compound is selected from ethylene oxide, propylene oxide and butylene oxide, preferably the oxirane compound is butylene oxide, more preferably 1,2 butylene oxide.

It has been found that oxide derivative of polymeric phosphate esters of polyisobutylene succinate ester prepared by reacting polymeric phosphate esters of polyisobutylene succinate ester with butylene oxide demonstrates better thermal stability of about 50% weight loss as determined by thermogravimetric analysis in a temperature range varying from about 350° C. to about 400° C., and has very low acidity varying from about 1 mg KOH/gm to about 20 mg KOH/gm as determined by titration of samples against normal alcoholic KOH samples and very low phosphorus contents varying from about 1% to about 5% of the additive.

In accordance with one of the preferred embodiments of the present invention, conventional PIBs and so-called "high-reactivity" PIBs (see for example EP-B-0565285) are suitable for use in present invention. High reactive PIB in this context is defined as a PIB wherein at least 50%, preferably 70% or more, of the terminal olefinic double bonds are of the vinylidene type, for example the GLISSOPAL compounds available from BASF.

It has been surprisingly discovered by the inventor of the present invention, that a polymer based phosphate ester, having low phosphorus content, low acidity and high thermal stability, and non-fouling nature gives very effective control of napthenic acid corrosion.

The level of protection [corrosion inhibition efficiency] afforded by employing polymeric corrosion inhibitors, particularly oxide derivative of polymeric phosphate esters of polyisobutylene succinate ester of present invention has been found to be about 99% at elevated temperature and that's too with very lower amounts of about 300 ppm. As stated herein above, this additive surprisingly has also been found to have substantially higher thermal stability, and lower acidity and lower phosphorus contents.

Therefore, the additives of present invention, particularly oxide derivative of polymeric phosphate esters of polyisobutylene succinate ester of present invention has been found to be capable of avoiding disadvantages associated with lower thermal stability, higher acidity and higher phosphorus contents.

Further, it has been observed that polymeric corrosion inhibitors of present invention surprisingly do not decompose, and therefore, do not produce deposits, and thereby avoid fouling problem.

In one embodiment, the present invention also relates to method for inhibiting naphthenic acid corrosion on metallic surfaces of the processing units which processes crude oils/feedstocks/hydrocarbon streams and/or their fractions containing naphthenic acid.

In one embodiment of the present invention, method for inhibiting naphthenic acid corrosion on metallic surfaces of the processing units processing the stream in a reactor containing naphthenic acid comprises following steps:—
a) heating the stream containing naphthenic acid to vaporize a portion thereof;
b) allowing the stream vapors to rise in a distillation column;
c) condensing a portion of the stream vapours passing through the distillation column to produce a distillate;
d) adding to the distillate a sufficient amount of naphthenic acid corrosion inhibitor additive so as to achieve inhibition of naphthenic acid corrosion;
e) allowing the distillate containing naphthenic acid corrosion inhibitor additive to substantially contact entire metallic surfaces of the distillation unit so as to form protective film thereon, whereby said surface is inhibited against corrosion;
wherein the process is characterized by adding corrosion inhibition amount of naphthenic acid corrosion inhibitor additive selected from polymeric phosphate ester of polyisobutylene succinate ester and oxide derivative of polymeric phosphate ester of polyisobutylene succinate ester.

In accordance with one of the embodiments of the present invention, the corrosion inhibition amount of naphthenic acid corrosion inhibitor additive varies from about 1 to about 2000 ppm.

In accordance with one of the embodiments of the present invention, the polymeric phosphate ester of polyisobutylene succinate ester is selected from compounds having one of the following structures I, II or III:—

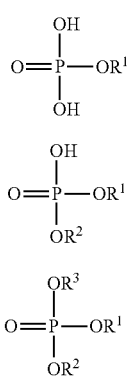

wherein $R^1$, $R^2$ and $R^3$ are hydroxy terminated polyisobutylene succinate ester having molecular weight varying from about 800-10,000 deltons.

In accordance with one of the embodiments of the present invention, the oxide derivatives of polymeric phosphate esters of polyisobutylene succinate ester is selected from compounds having one of the following structures A or B:—

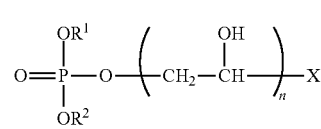

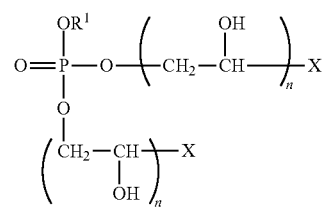

wherein $R^1$ and $R^2$ are hydroxy terminated polyisobutylene succinate ester having molecular weight varying from about 800-10,000 delton;
X is H, $CH_3$ or $C_2H_5$; and
n may vary from 1 to 20.

In accordance with one of the preferred embodiments of the present invention, the stream includes crude oil, feedstock, and hydrocarbon streams and/or fractions thereof.

It is advantageous to treat distillation column, trays, pumparound piping and related equipment to prevent naphthenic acid corrosion, when condensed vapours from distilled hydrocarbon fluids contact metallic equipment at temperatures varying from about 200° C. to about 400° C. so that severe conditions of naphthenic acid corrosion are substantially avoided.

In accordance with preferred embodiment of present invention, the additive is generally added to the condensed distillate and the condensed distillate is allowed to contact the metallic surfaces of the distillation column, packing, trays, pump around piping and related equipment as the condensed distillate passes down the column and into the distillation vessel. The distillate may also be collected as product. The unreacted corrosion inhibitors of the instant invention remain in the resultant collected product.

In commercial practice, the additives of present invention may be added to a distillate return to control corrosion in a draw tray and in the column packing while a second injection may be added to a spray oil return immediately below the draw trays to protect the tower packing and trays below the distillate draw tray.

It may be noted that it is not so critical where the additive of the invention is added as long as it is added to distillate that is later returned to the distillation vessel, or which contact the metallic interior surfaces of the distillation column, trays, pump around piping and related equipments so that these surfaces are substantially protected from naphthenic acid corrosion.

In one embodiment, the present invention relates to use of additives selected from polymeric phosphate ester of polyisobutylene succinate ester and oxide derivative of polymeric phosphate ester of polyisobutylene succinate ester as naphthenic acid corrosion inhibitors to inhibit naphthenic acid corrosion in crude oils/feedstocks/hydrocarbon streams.

In another embodiment, the present invention also relates to use of additives selected from polymeric phosphate ester of polyisobutylene succinate ester and oxide derivative of polymeric phosphate ester of polyisobutylene succinate ester as naphthenic acid corrosion inhibitors to inhibit naphthenic acid corrosion in crude oils/feedstocks/hydrocarbon streams by employing the method of inhibition of present invention.

The present invention is now explained with the help of following examples, which have been incorporated for explaining its best mode and are not intended to limit its scope.

EXAMPLES OF THE INVENTION

Example 1

Step 1: Preparation of Polyisobutenyl succinic anhydride

About 89.48% by wt of high reactive polyisobutylene is reacted with about 10.52% by wt of maleic anhydride by employing following process steps:—
1. Charging high reactive polyisobutylene into a clean and dry four necked flask equipped with nitrogen inlet, stirrer and thermometer;
2. Raising the temperature to about 125° C.;
3. Starting $N_2$ gas bubbling and continuing it for about 10 minutes;
4. Stopping or reducing rate of $N_2$ gas bubbling and a sample for moisture content is taken out;
5. Adding maleic anhydride at a temperature of about 125° C.;
6. After addition of maleic anhydride raising the temperature to about 170° C. and maintaining this temperature for about 2 hours with nitrogen bubbling;
7. After completion of said period of step 6, raising the temperature to about 205° C., and heating at a rate that it reaches in a range of temperature varying from about 170° C. to about 205° C. in about 3 hours, and such rate is about 5° C. per 25 min;
8. maintaining the reaction mass at about 205° C. for about 6 hours;
9. After completion of said period of about 6 hours at a temperature of about 205° C., the reaction mixture is cooled to a temperature of about 170° C.;
10. raising the temperature of the reaction mixture to about 205° C. while applying slow vacuum, which is continued for about 2 hrs at vacuum of about 10 mm; After 2 hours sample online—I for Acid value and free maleic acid and after 3 hours sample online—II for Acid value and free maleic acid were drawn.

The polyisobutenyl succinic anhydride prepared was found to have acid value of about 110 mg KOH/gm. Typically the range is between 70 to 120 mg KOH/gm.

Step II: Preparation of hydroxy terminated polyisobutylene succinate ester [HRPIB]

About 79.89% by wt of polyisobutylene succinic anhydride [PIBSA] prepared in step—I is reacted with about 20.11% by wt of mono ethylene glycol to form hydroxy terminated polyisobutylene succinate ester [HRPIB], wherein PIBSA is diluted on toluene to about 85% strength, in this example it is of 85.714% strength] by employing following process steps:—
1. Charging diluted PIBSA and mono ethylene glycol in a dean stark vessel;
2. Raising the temperature of reaction mixture to about 190° C. while removing toluene and water from dean stark to reach the desired temperature and while bubbling with nitrogen gas;
3. The temperature of about 190° C. is maintained to achieve desired acid value of about 5 mg KOH/gm or less.

Example 2

Preparation of polymeric phosphate ester of polyisobutylene succinate ester

The polymeric phosphate ester of polyisobutylene succinate ester of present invention is prepared by reacting hydroxy terminated polyisobutylene succinate ester [HRPIB] prepared in step 2 of example 1 with phosphorus pentoxide in following manner:—

Example 2a

About 94.23% by wt of hydroxy terminated polyisobutylene succinate ester [HRPIB] prepared in step 2 of example 1 is reacted with about 5.77% by wt of phosphorus pentoxide to prepare polymeric phosphate ester of polyisobutylene succinate ester having phosphorus content of about 2.5% of the additive by employing following steps:—
1. Charging HRPIB with nitrogen gas blanket while raising temperature to about 90° C.;
2. Adding phosphorus pentaoxide ($P_2O_5$) in two equal lots at about 15 minutes interval, wherein the exotherm is observed;
3. After addition of phosphorus pentoxide, the reaction mixture is continuously stirred for about 15 minutes and the temperature is raised to about 140° C. along with nitrogen gas blanket;
4. Maintaining said temperature for about 1 hour followed by cooling to about 70° C. and diluting to about 50% strength [about 1:1] with toluene solvent;
5. filtering by bed made by Hiflow or clay to remove impurities and to result in polymeric phosphate ester of polyisobutylene succinate ester.

The oven dried sample of polymeric phosphate ester of polyisobutylene succinate ester prepared as above has been found to have acid value of about 55.3 mg KOH/gm.

Example 2b

About 93.09% by wt of hydroxy terminated polyisobutylene succinate ester [HRPIB] prepared in step 2 of example 1 is reacted with about 6.91% by wt of phosphorus pentoxide in same manner as above to prepare polymeric phosphate ester of polyisobutylene succinate ester having phosphorus content of about 3.0% of the additive.

The oven dried sample of polymeric phosphate ester of polyisobutylene succinate ester prepared in Example 2b as above has been found to have acid value of about 62.51 mg KOH/gm.

Example 3

Preparation of oxide derivative of polymeric phosphate esters of polyisobutylene succinate ester Example 3a About 91.74% by wt of polymeric phosphate esters of polyisobutylene succinate ester prepared in above Example 2a is reacted with about 8.26% by wt of 1,2 butylene oxide to result in oxide derivatives of polymeric phosphate ester of polyisobutylene succinate ester having phosphorus content of about 2.30% of the additive by employing following steps:—

It was observed acid value was 55.3 mg KOH/gm for the example 2a, which surprisingly drastically reduced to about 3 mg KOH/gm for example 3a which is for oxide derivative.
1. Charge polymeric phosphate esters of polyisobutylene succinate ester prepared in above Example 2 with 1,2 butylene oxide in two lots at an interval of about 15 minutes, wherein the exotherm is observed at about 10 to 15° C.;
2. Raising the temperature of reaction mixture to about 60° C.;
3. Maintaining the said temperature for about 2 hours when a sample is drawn after about 1 hr, which should have acid value in the range of about 0 to about 5 mg KOH/gm for Example 2 products.

The sample of oxide derivative of polymeric phosphate ester of polyisobutylene succinate ester prepared as above has been found to have acid value of about 3.0 mg/KOH/gm.

Example 3b

About 90.90% by wt of polymeric phosphate esters of polyisobutylene succinate ester prepared in above Example 2b is reacted with about 9.10% by wt of 1,2 butylene oxide to result in oxide derivatives of polymeric phosphate ester of polyisobutylene succinate ester having phosphorus content of about 3.0% of the additive by employing process steps as for example 3a.

The sample of oxide derivative of polymeric phosphate ester of polyisobutylene succinate ester prepared as above in Example 3b has been found to have acid value of about 2.5 mg KOH/gm.

It is observed that acid value of the oxide derivative [example 3b] is dramatically reduced to about 2.5 mg KOH/gm when compared to acid value of its corresponding ester of Example 2b, which was found to have acid value of about 62.5 mg KOH/gm.

It may be noted that oxide derivative of polymeric phosphate ester of polyisobutylene succinate ester surprisingly has substantially reduced acid value as compared to polymeric phosphate ester of polyisobutylene succinate ester.

Therefore, oxide derivative of polymeric phosphate ester of polyisobutylene succinate ester additive is most preferred choice of present invention.

Example 4

High Temperature Naphthenic Acid Corrosion Test

In this example, various amounts of a 50% additives prepared in accordance with Examples 2 and 3, were tested for corrosion inhibition efficiency on carbon steel coupons in hot oil containing naphthenic acid. A weight loss coupon immersion test was used to evaluate the invention compound for its effectiveness in inhibition of naphthenic acid corrosion at 290° C. temperature. Different dosage such as 300, 400 and 600 ppm of invention compound were used as 50% active solution.

A static test on steel coupon was also conducted without using any additive of present invention. This test provided a blank test reading.

The reaction apparatus consisted of a one—litre four necked round bottom flask equipped with water condenser, $N_2$ purger tube, thermometer pocket with thermometer and stirrer rod. 600 gm (about 750 ml) paraffin hydrocarbon oil (D-130) was taken in the flask. The $N_2$ gas purging was started with flow rate of about 100 cc per minute and the temperature was raised to about 100° C., which temperature was maintained for about 30 minutes.

Additive compounds of examples 2 and 3 were added in separate batch tests. The reaction mixture was stirred for about 15 minutes at about 100° C. temperature. After removing the stirrer, the temperature of the reaction mixture was raised to about 290° C. A pre-weighed weight-loss carbon steel coupon CS 1010 with dimensions 76 mm . . . times 13 mm . . . times 1.6 mm was immersed. After maintaining this condition for about 1 hour to about 1.5 hours, about 31 gm of naphthenic acid (commercial grade with acid value of about 230 mg KOH/gm) was added to the reaction mixture. A sample of one gm weight of reaction mixture was collected for determination of acid value, which was found to be approximately 11.7 mg KOH/gm. This condition was maintained for four hours. After this procedure, the metal coupon was removed, excess oil was rinsed away, the excess corrosion product was removed from the metal surface. Then the metal coupon was weighed and the corrosion rate was calculated in mils per year.

Calculation of Corrosion Inhibition Efficiency:—

The method used in calculating Corrosion Inhibition Efficiency as given below. In this calculation, corrosion inhibition efficiency provided by additive compound is calculated by comparing weight loss due to additive with weight loss of blank coupon (without any additive).

$$\text{Corrosion Inhibition Efficiency} = \frac{(\text{Weight loss for blank without additive}) - (\text{weight loss with additive})}{(\text{weight loss for blank without additive})} \times 100$$

The corrosion rate in MPY (mils per year) is calculated by the formula, $$MPY = \frac{534 \times \text{Weight loss in mg}}{(\text{Density in gm/cc}) \times (\text{Area in in}^2) \times (\text{Time of test in hours})}$$

The calculated magnitudes are entered in the Tables in appropriate columns.

The results of the experiments are presented in Table I and II.

TABLE I

[with 2.5% Phosphorous for non-butylene oxide treated and 2.3% Phosphorous for Butylene oxide treated]

| Experiment No. | Compound | Dosage in Ppm | Effective Dosage in ppm | Weight Loss in mg | Corrosion Rate MPY | Corrosion Inhibition efficiency |
|---|---|---|---|---|---|---|
| 1 | Blank | — | — | 89 | 445 | — |
| 2 | EXAMPLE 2a | 600 | 300 | 18.4 | 92 | 79 |
|   |   | 400 | 200 | 20.7 | 103 | 77 |

TABLE I-continued

[with 2.5% Phosphorous for non-butylene oxide treated and 2.3% Phosphorous for Butylene oxide treated]

| Experiment No. | Compound | Dosage in Ppm | Effective Dosage in ppm | Weight Loss in mg | Corrosion Rate MPY | Corrosion Inhibition efficiency |
|---|---|---|---|---|---|---|
| 3 | EXAMPLE 3a | 600 | 300 | 1 | 5 | 99 |
|   |   | 400 | 200 | 5.4 | 27 | 94 |
|   |   | 200 | 100 | 23.5 | 117 | 74 |

In the table above example 2a refers to polymeric phosphate ester of polyisobutylene succinate ester prepared in accordance with example 2a and example 3a refers to oxide derivative of polymeric phosphate ester of polyisobutylene succinate ester prepared in accordance with Example 3a.

It can be observed from the table above that additive of Example 2a gives corrosion protection of about 79% with effective dosage of 300 ppm. However, with additive of Example 3a, the level of protection surprisingly dramatically improves. The maximum efficiency observed for additive of Example 2a is only 79% at a active dosage of 300 ppm, and whereas for the additive of Example 3a the corrosion inhibition efficiency is about 99% at the same dosage and about 94% at effective dosage of about 200 ppm.

The above data clearly establishes that oxide derivatives of polymeric phosphate ester of polyisobutylene succinate ester surprisingly have substantially high corrosion inhibition efficiency even at very low dosages as compared to corresponding polymeric phosphate ester of polyisobutylene succinate ester.

Therefore, oxide derivatives of polymeric phosphate ester of polyisobutylene succinate ester additive are most preferred choice of present invention.

It may be noted that above experiments have been performed only with effective amount upto 300 ppm of the inhibitors of present invention and corrosion inhibition efficiency has been found to be 99% in case of oxide derivatives of polymeric phosphate ester of polyisobutylene succinate ester additive. It is possible to achieve even higher efficiency by employing higher amounts of the inhibitors of present invention.

TABLE II

[with 3.0% Phosphorous for NON butylene oxide treated and 2.7% Phosphorous for Butylene oxide treated]

| Experiment No. | Compound | Dosage in ppm | Effective Dosage in ppm | Weight Loss in mg | Corrosion Rate MPY | Corrosion Inhibition efficiency |
|---|---|---|---|---|---|---|
| 1 | Blank | — | — | 89 | 445 | — |
| 2 | EXAMPLE 2b | 600 | 300 | 16.1 | 80 | 82 |
| 3 | EXAMPLE 3b | 600 | 300 | 3.1 | 16 | 96 |
|   |   | 400 | 200 | 6.8 | 34 | 92 |
|   |   | 300 | 150 | 10.4 | 52 | 88 |

In the table above example 2b refers to polymeric phosphate ester of polyisobutylene succinate ester prepared in accordance with example 2b and example 3b refers to oxide derivative of polymeric phosphate ester of polyisobutylene succinate ester prepared in accordance with Example 3b.

It can be observed from the table above that additive of Example 2b gives corrosion protection of about 82% with effective dosage of 300 ppm. However, with additive of Example 3b, the level of protection surprisingly dramatically improves. The maximum efficiency observed for additive of Example 2b is only 82% at a active dosage of 300 ppm, and whereas for the additive of Example 3b the corrosion inhibition efficiency is about 96% at the same dosage and about 92% at effective dosage of about 200 ppm, and about 88% at effective dosage of about 150 ppm.

The corrosion inhibition tests as per example above were also conducted for prior art additive Step 2 of example 1. The results are tabulated in table III. The additive of step 2 of example 1 is hydroxyl terminated polyisobutylene succinate ester. and prior art additive 1, 2 are 2 ethyl hexyl phosphate, (please refer to thermal analysis section for details of prior art additive).

TABLE III

Corrosion Inhibition Test of Prior Art Additive and Hydroxy Terminated Polymer.

| Details | Active ppm (100%) | Mg loss after test | MPY after test | % Efficiency after test |
|---|---|---|---|---|
| Prior art 1 (11.7% Phosphorous) | 100 | 12.1 | 60.6 | 86.4 |
| Prior art 2 (15.4% Phosphorous) | 100 | 7.87 | 39.04 | 91.2 |
| Example 1 step 2, Hydroxy terminated Polyisobutylene ester (No phosphorous) | 500 | 70.0 | 350 | 21.3 |

In the table above the corrosion inhibition values of the prior art additives 2-ethyl hexyl phosphate having various Phosphorous content are given. It is observed that at 100 ppm the prior art additives gives a maximum protection of 91.2%. The prior art additive 1 has a phosphorous content of 11.7% and the prior art additive 2 has a phosphorous content 15.4%. If the dosage multiplied by the percent phosphorous content will give the P used for the corrosion protection. Thus for the prior art additive 1, the P used for the corrosion protection is 11.7 ppm and that for the prior art additive it is 15.4 ppm.

If the above values are compared with the data of the invention additives as shown in above Tables 1, and 2, it can be concluded that in the case of Example 3a and Example 3b, the P content used for the corrosion protection is only about 4.8 ppm for 94% efficiency and 5.4 ppm for 92% efficiency. It is well known to those skilled in the prior art that P is an strong poison for the catalyst used for hydrocracking operations. It is desirable to use additive with least phosphorous content. Therefore, the additives, particularly the oxide additive of present invention is most preferred choice.

Example 5

High Temperature Naphthenic Acid Corrosion Dynamic Test

The dynamic testing was carried out by using rotating means provided in the temperature-controlled autoclave and was carried out by using passivated steel coupons. A dynamic test on steel coupon was conducted without using any additive. This test provided a blank test reading. The passivation procedure is explained below:—

Passivation Procedure:—

About 600 gm of paraffin hydrocarbon oil (D-130) was taken in a reaction vessel comprising a four necked round bottom flask equipped with water condenser, $N_2$ purger tube, thermometer pocket with thermometer and stirrer rod. The $N_2$ gas was purged. For passivation of the steel coupon, various amounts of compound of Example 3a 200 400 ppm, (each of which included 50% active additive compound), were added to this reaction mixture. The reaction mixture was stirred for about 15 minutes at about 100° C. temperature. After removing the stirrer, the temperature of the reaction mixture was raised to about 290° C. A pre-weighed weight-loss coupon CS 1010 with dimensions 76 mm . . . times 13 mm . . . times 1.6 mm was immersed. After maintaining this condition for about 4 hours, the steel coupon was removed, excess oil was rinsed away, and the coupon was dried. The metal coupon was weighed. This formed the pre-passivated coupon.

In this example, various amounts of a about 50% of additive prepared in accordance with Examples 3a were tested dynamically for corrosion inhibition efficiency on steel coupons in a hot oil containing naphthenic acid. A weight-loss coupon immersion dynamic test was used to evaluate the invention compound for its effectiveness in inhibition of naphthenic acid corrosion at 290° C. temperature in dynamic condition.

The following test equipment and materials were used in the Dynamic Corrosion Test:
 1. Temperature controlled autoclave
 2. Preweighed weight-loss carbon steel coupons CS 1010 with dimensions 76 mm . . . times 13 mm . . . times 1.6 mm.
 3. Means to rotate the coupon, to provide a peripheral velocity in excess of 3 m/second.

Material:
 1. Paraffin hydrocarbon oil (D-130) with naphthenic acid added to provide an acid neutralization number of approximately 2 mg/KOH.
 2. Nitrogen gas in the vapour space.

Two pre-weighed and pre-passivated weight-loss carbon steel coupons, were clamped to the rotating means of the autoclave. The dynamic test was conducted at about 290° C. for about 4 hours. In one test only passivated coupons were used and in another test passivated and 30 ppm of product was additionally added. After the test, the coupons were removed, excess oil was rinsed away, excess corrosion product was removed from the surface of coupons. The coupons were then weighed and the corrosion rate was calculated as mils/year. The results of this dynamic test are presented in Table IV In Table IV, Experiment no 2 only the passivated coupons were used in Expt no. 3 passivated coupons were used and additional product of 30 ppm was added. It can be seen from the table that only additives of present invention give excellent protection with mere passivation also.

TABLE IV dynamic test data

| Expt. No. | Compound | Dosage in Ppm (100%) | Effective Dosage in ppm | Weight Loss in mg | Corrosion Rate MPY | Corrosion Inhibition efficiency | Passivation Dose in ppm |
|---|---|---|---|---|---|---|---|
| 1 | Blank | — | — | 7.5 | 37.5 | — | — |
| 2 | Example 3a | — | — | 0 | 0 | 100 | 200 |
|   |            |    |    | 0.2 | 1 | 97 | 100 |
| 3 | Example 3a | 30 | 15 | 0 | 0 | 100 | 200 |
|   |            |    |    | 0 | 0 | 100 | 100 |

Fouling Tendency of the Additives of the Invention:—

The fouling tendency of additives of the present invention was determined by heating a 1% solution of the additives in the oil at about 290° C. for about 2 hours. It has been found that additives of Examples 3a and 3b did not give any haze or precipitate confirming that no fouling takes place. Neglible precipitate was seen for example 2a and 2b. The prior art additive 1 and 2 (please refer thermal analysis section for details of prior art additive) showed heavy precipitate. Tributyl Phosphate another commonly used additive for naphthenic acid corrosion inhibition also showed high amount of haziness.

The above results demonstrates the advantages of polymeric phosphate esters.

Thermal Stability Analysis:—

The Thermal Stability studies were compared with prior art additives named –2 ethyl hexyl phosphate ester, which were prepared by reacting 73.34% by wt of 2-Ethyl Hexanol with 26.66% by wt of Phosphorous Pentoxide, which in below table is identified as Prior Art 1, and was found to have phosphorus contents of about 11.5% by wt; and by reacting 64.72% by wt of 2-Ethyl Hexanol with 35.28% by wt of Phosphorous Pentoxide, which in below table is identified as Prior Art 2, and was found to have phosphorus contents of about 15.4% by wt, and thermal stability results are given in Table V below.

TABLE V

Thermogravimetric Analysis

| Product | Phosphorous, % | Temp. Deg C. at 50% loss | Residue @ 600 deg C. |
|---|---|---|---|
| PRIOR ART 1 | 11.5 | 220 | 28.5632 |
| PRIOR ART 2 | 15.4 | 192 | 36.9247 |
| Example 2a | 2.50 | 393 | 9.0379 |
| Example 3a | 2.28 | 384 | 5.9965 |
| Example 2b | 3.0 | 390 | 7.3786 |

The thermal analysis test of the additives of present invention and the additives of prior art were carried out in the Mettler Toledo Thermo Gravimetric Analyzer. A known weight of the sample was heated in the analyzer from 30° C. to 600° C. at a rate of 10° C./minute under nitrogen atmosphere. The temperature at which 50% loss in weight of sample occurs is taken as the representative of thermal stability. The weight of the residue obtained at 600° C., and the temperature at 50% weight loss are presented in Table V. The weight of the residue is indicative of the tendency of the additive, to deposit at high temperature zones of equipments like furnaces, which may cause fouling of the equipment in due course.

Discussion about Thermal Stability:

It can be seen from the above table that the invention compounds (example 2a to example 3b, example 2b) the temperature of 50% weight loss varies from (393° C., 384° C. to 393° C.) respectively. These values are much higher when compared with the prior additives which have a value of only 220° C. and 192° C. These findings clearly indicate the higher thermal stability of the invention compounds when compared with the prior art compounds.

It is known to the person skilled in the art that it is desirable to have additives with higher thermal stability since these will not decompose to volatile products leading to fouling and contamination of other streams. The other advantage of thermally stable compound is they retain their corrosion inhibition efficiency at higher temperatures.

The above data clearly establishes that oxide derivatives of polymeric phosphate ester of polyisobutylene succinate ester surprisingly have substantially high thermal stability at elevated temperature as compared to corresponding polymeric phosphate ester of polyisobutylene succinate ester.

It is also observed that treatment of polymeric phosphate ester of polyisobutylene succinate ester with butylene oxide in accordance with present invention results in reduction of phosphorous contents and also the residue at 600° C.

It is also seen from the above table that the invention compounds leave much lower residues at 600° C. The residue obtained for the invention compounds (experiment 2a, 2b, 3b in the above table) is much lower than the prior additives [Prior art 1 and Prior Art 2] which is 28.5632 and 38.9247% (in the table). The above data clearly indicates that the invention compounds will have least deposition tendency in the areas of furnace.

In view of above findings, the oxide derivatives of polymeric phosphate ester of polyisobutylene succinate ester are the most preferred choice of present invention.

Accordingly, it is well understood that the naphthenic acid corrosion inhibitors, particularly the oxide derivatives of the present invention, and prepared in accordance with present invention, which have been found to be polymeric in nature are capable of overcoming above-described drawbacks and problems of the prior art.

As also established with the help of forgoing examples, the naphthenic acid corrosion inhibitors of present invention have been found to be effective and thermal stability at elevated temperatures. These inhibitors have not been found to get decomposed and deposited at metallic surfaces of the reactor/distillation unit. These inhibitors have not been found to cause fouling and other associated problems, and therefore, are capable of effectively treating Indian crude oil, and crude oil from countries like China, Africa and Europe without causing corrosion due to presence of naphthenic acid.

Further, the corrosion inhibitors of present invention have also been found to be effective for possible concentrations of naphthenic acid in the stream that's too without causing associated disadvantages.

Further, the above experiments also confirm that inhibitors, particularly the oxide derivatives of the present invention have lower acidity and have not been found to contribute to acidity of the stream being treated, and have been found to have lower and effective amounts of phosphorus.

It may be noted that effectiveness of present inhibitors has been checked for crude oil containing naphthenic acid, but these are suitable for crude oil containing naphthenic acid and sulfur compounds.

It will be apparent from the foregoing discussion that the present invention comprises the following items:

1. A polymeric phosphate ester of polyisobutylene succinate ester which is capable of acting as naphthenic acid corrosion inhibitor by inhibiting naphthenic acid corrosion in crude oil/feedstock/hydrocarbon streams containing naphthenic acid, and demonstrating higher thermal stability at elevated temperature varying from about 200° C. to about 400° C. [about 400° F. to about 750° F.].
2. A corrosion inhibitor as described in item 1, wherein said ester is selected from polymeric phosphate esters having one of the following structures I, II or III:—

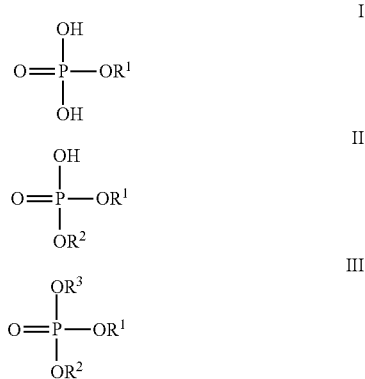

wherein $R^2$ and $R^3$ are hydroxy terminated polyisobutylene succinate ester having molecular weight varying from about 800-10,000 deltons.

3. An oxide derivative of polymeric phosphate ester of polyisobutylene succinate ester which is capable of acting as naphthenic acid corrosion inhibitor by inhibiting naphthenic acid corrosion in crude oil/feedstock/hydrocarbon streams containing naphthenic acid, and demonstrating higher thermal stability at elevated temperature varying from about 200° C. to about 400° C. [about 400° F. to about 750° F.].

4. A corrosion inhibitor as described in item 3, wherein said oxide derivative is selected from polymeric phosphate esters having one of the following structures A or B:—

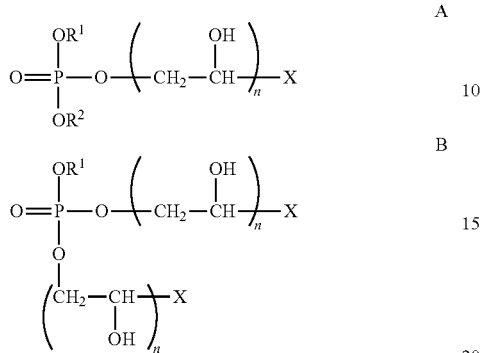

wherein $R^1$ and $R^2$ are hydroxy terminated polyisobutylene succinate ester having molecular weight varying from about 800-10,000 delton;

X is H, $CH_3$ or $C_2H_5$; and n may vary from 1 to 20.

5. A corrosion inhibitor as described in any one of the preceding items, wherein said inhibitor has thermal stability of about 50% weight loss as determined by thermogravimetric analysis in a temperature range varying from about 350° C. to about 400° C.

6. A corrosion inhibitor as described in any one of the preceding items, wherein said inhibitor has acidity varying from about 1 mg KOH/gm to about 80 mg KOH/gm as determined by titration of samples against normal alcoholic KOH.

7. A corrosion inhibitor as described in any one of the preceding items, wherein said inhibitor has phosphorus contents varying from about 2% to about 5% of the inhibitor.

8. A corrosion inhibitor as described in items 1 or 2, wherein said inhibitor is prepared by reacting polyisobutylene succinic anhydride [PIBSA] with a glycol to form hydroxy terminated polyisobutylene succinate ester, which is reacted with phosphorus pentoxide to result in polymeric phosphate esters of polyisobutylene succinate esters.

9. A corrosion inhibitor as described in item 8, wherein said glycol is selected from mono-glycols, aliphatic glycols, aryl glycols, di-glycols, and aliphatic di-glycols, aryl di-glycols, particularly mono-glycols, aliphatic glycols, aryl glycols, more particularly ethylene glycol.

10. A corrosion inhibitor as described in items 8 or 9, wherein said glycol and PIBSA are taken in a mole ratio varying from about 1:04 to about 1:1 mole.

11. A corrosion inhibitor as described in item 8, wherein said phosphorus pentoxide and said hydroxy terminated polyisobutylene succinate ester are taken in a ratio of $P_2O_5$ to hydroxy terminated polyisobutylene succinate ester as 0.01 to 4 mole of $P_2O_5$ to 1 mole of hydroxy terminated polyisobutylene succinate ester.

12. A corrosion inhibitor as described in item 8, wherein said PIBSA is prepared by reacting high reactive polyisobutylene with maleic anhydride.

13. A corrosion inhibitor as described in item 12, wherein said high reactive polyisobutylene is reacted with maleic anhydride after taking in a mole ratio varying from about 1:0.5 to about 1:1.

14. A corrosion inhibitor as described in items 3 or 4, wherein said oxide derivative of polymeric phosphate esters of polyisobutylene succinate ester is prepared by reacting polymeric phosphate esters of polyisobutylene succinate ester of item 1 or 2 with oxirane compound to result in oxide derivatives of polymeric phosphate ester of polyisobutylene succinate ester.

15. A corrosion inhibitor as described in item 14, wherein said oxirane compound is selected from ethylene oxide, propylene oxide and butylene oxide, preferably the oxirane compound is butylene oxide, more preferably 1,2 butylene oxide.

16. A corrosion inhibitor as described in items 14 or 15, wherein said inhibitor has thermal stability of about 50% weight loss as determined by thermogravimetric analysis in a temperature range varying from about 350° C. to about 400° C., and acidity varying from about 1 mg KOH/gm to about 20 mg KOH/gm as determined by titration of samples against normal alcoholic KOH samples and phosphorus contents varying from about 1% to about 5% of the inhibitor.

17. A method for inhibiting naphthenic acid corrosion on metallic surfaces of the processing units processing the stream containing naphthenic acid in a reactor comprises following steps:—
    a) heating the stream containing naphthenic acid to vaporize a portion thereof;
    b) allowing the stream vapors to rise in a distillation column;
    c) condensing a portion of the stream vapours passing through the distillation column to produce a distillate;
    d) adding to the distillate a sufficient amount of naphthenic acid corrosion inhibitor so as to achieve inhibition of naphthenic acid corrosion;
    e) allowing the distillate containing naphthenic acid corrosion inhibitor additive to substantially contact entire metallic surfaces of the distillation unit so as to form protective film thereon, whereby said surface is inhibited against corrosion;
        wherein the process is characterized by adding corrosion inhibition amount of said naphthenic acid corrosion inhibitor which is selected from polymeric phosphate ester of polyisobutylene succinate ester and oxide derivative of polymeric phosphate ester of polyisobutylene succinate ester.

18. A method as described in item 17, wherein said corrosion inhibition amount of said naphthenic acid corrosion inhibitor varies from about 1 to about 2000 ppm.

19. A method as described in item 17, wherein said polymeric phosphate ester of polyisobutylene succinate ester is selected from compounds having one of the following structures I, II or III:—

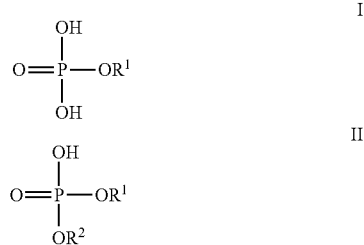

-continued

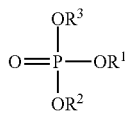
III wherein $R^1$, $R^2$ and $R^3$ are hydroxy terminated polyisobutylene succinate ester having molecular weight varying from about 800-10,000 deltons.

20. A method as described in item 17, wherein said oxide derivatives of polymeric phosphate esters of polyisobutylene succinate ester is selected from compounds having one of the following structures A or B:—

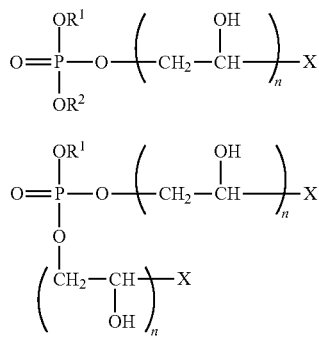

wherein $R^1$ and $R^2$ are hydroxy terminated polyisobutylene succinate ester having molecular weight varying from about 800-10,000 delton;
X is H, $CH_3$ or $C_2H_5$; and n may vary from 1 to 20.

21. A method as described in any one of the items 17 to 20, wherein said stream includes crude oil, feedstock, and hydrocarbon streams and/or fractions thereof 22. A method as described in any one of the items 17 to 21, wherein said inhibitor is added to distillate that is later returned to the reactor, or which contact the metallic interior surfaces of the reactor so that metallic surfaces are substantially protected from naphthenic acid corrosion.

23. Use of additive polymeric phosphate ester of polyisobutylene succinate ester as described in items 1 or 2 as naphthenic acid corrosion inhibitor to inhibit naphthenic acid corrosion in crude oils/feedstocks/hydrocarbon streams.

24. Use of additive oxide derivative of polymeric phosphate ester of polyisobutylene succinate ester as described in item 3 or 4 as naphthenic acid corrosion inhibitors to inhibit naphthenic acid corrosion in crude oils/feedstocks/hydrocarbon streams.

25. A corrosion inhibitor substantially as herein described with reference to the foregoing examples.

26. A method for inhibiting naphthenic acid corrosion substantially as herein described with reference to the foregoing examples.

27. Use of corrosion inhibitor substantially as herein described with reference to the foregoing examples.

The invention claimed is:
1. A naphthenic acid corrosion inhibitor consisting of polymeric phosphate ester of polyisobutylene succinate ester to inhibit naphthenic acid corrosion in crude oil, feedstock, or hydrocarbon streams containing naphthenic acid; and
    wherein said inhibitor has thermal stability of about 50% weight loss as determined by thermogravimetric analysis in a temperature range varying from 350° C. to 400° C.; and
    wherein said polymeric phosphate ester of polyisobutylene succinate ester is a reaction product of:
    (a) reacting, in first step, a mixture consisting of polyisobutylene succinic anhydride [PIBSA] and a glycol while bubbling with nitrogen gas to produce hydroxy terminated polyisobutylene succinate ester having acid value of about 5 mg KOH/gm or less;
    (b) reacting, in second step, the hydroxy terminated polyisobutylene succinate ester of the first step with phosphorus pentoxide ($P_2O_5$) while maintaining nitrogen gas blanket to produce said polymeric phosphate ester of polyisobutylene succinate ester.

2. A naphthenic corrosion inhibitor as claimed in claim 1, wherein said ester is selected from polymeric phosphate esters having one of the following structures I, II or III:—

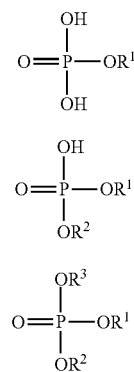

wherein the $R^1$, $R^2$ and $R^3$ are hydroxy terminated polyisobutylene succinate ester having molecular weight varying from 800-10,000 Daltons.

3. A naphthenic corrosion inhibitor as claimed in claim 1, wherein said inhibitor has phosphorus contents varying from 2% to 5% of the inhibitor.

4. A naphthenic corrosion inhibitor as claimed in claim 1, wherein said glycol comprises mono-glycols, aliphatic glycols, aryl glycols, di-glycols, aliphatic di-glycols, or aryl di-glycols.

5. A naphthenic corrosion inhibitor as claimed in claim 1, wherein said glycol and PIBSA are taken in a mole ratio varying from 1:0.4 to 1:1 mole.

6. A naphthenic corrosion inhibitor as claimed in claim 1, wherein said phosphorus pentoxide and said hydroxy terminated polyisobutylene succinate ester are taken in a ratio of $P_2O_5$ to hydroxy terminated polyisobutylene succinate ester as 0.01 to 4 mole of $P_2O_5$ to 1 mole of hydroxy terminated polyisobutylene succinate ester.

7. A naphthenic corrosion inhibitor as claimed in claim 1, wherein said PIBSA is prepared by reacting high reactive polyisobutylene [HRPIB] with maleic anhydride.

8. A naphthenic corrosion inhibitor as claimed in claim 7, wherein said high reactive polyisobutylene is reacted with maleic anhydride in a mole ratio varying from 1:0.5 to 1:1.

9. A method for inhibiting naphthenic acid corrosion on metallic surfaces of the processing units processing the stream containing naphthenic acid in a reactor comprises following steps:—
a) heating the stream containing naphthenic acid to vaporize a portion thereof;
b) allowing the stream vapors to rise in a distillation column;
c) condensing a portion of the stream vapours passing through the distillation column to produce a distillate;
d) adding to the distillate a sufficient amount of naphthenic acid corrosion inhibitor so as to achieve inhibition of naphthenic acid corrosion;
e) allowing the distillate containing naphthenic acid corrosion inhibitor additive to substantially contact entire metallic surfaces of the distillation unit so as to form protective film thereon, whereby said surface is inhibited against corrosion;
wherein the process is characterized by adding corrosion inhibition amount of said naphthenic acid corrosion inhibitor which is selected from polymeric phosphate ester of polyisobutylene succinate ester as claimed in claim 1 and its oxide derivative.

10. A method as claimed in claim 9, wherein said corrosion inhibition amount of said naphthenic acid corrosion inhibitor varies from 1 to 2000 ppm.

11. A method as claimed in claim 9, wherein said polymeric phosphate ester of polyisobutylene succinate ester is selected from compounds having one of the following structures I, II or III:—

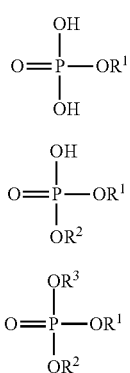

wherein the $R^1$, $R^2$ and $R^3$ are hydroxy terminated polyisobutylene succinate ester having molecular weight varying from 800-10,000 Daltons.

12. A method as claimed in claim 9, wherein said stream includes crude oil, feedstock, and hydrocarbon streams and/or fractions thereof.

13. A method as claimed in claim 9, wherein said inhibitor is added to distillate that is later returned to the reactor, or which contact the metallic interior surfaces of the reactor so that metallic surfaces are substantially protected from naphthenic acid corrosion.

14. A method comprising using naphthenic acid corrosion inhibitor consisting of polymeric phosphate ester of polyisobutylene succinate ester as claimed in claim 1 to inhibit naphthenic acid corrosion in crude oils, feedstocks, or hydrocarbon streams.

15. A naphthenic corrosion inhibitor as claimed in claim 1, wherein said glycol is ethylene glycol.

16. A method comprising using naphthenic acid corrosion inhibitor consisting of polymeric phosphate ester of polyisobutylene succinate ester as claimed in claim 2 to inhibit naphthenic acid corrosion in crude oils, feedstocks, or hydrocarbon streams.

17. A naphthenic acid corrosion inhibitor consisting of oxide derivative of polymeric phosphate ester of polyisobutylene succinate ester to inhibit naphthenic acid corrosion in crude oil, feedstock, hydrocarbon streams containing naphthenic acid; and
wherein said inhibitor has thermal stability of about 50% weight loss as determined by thermogravimetric analysis in a temperature range varying from 350° C. to 400° C.;
wherein said inhibitor has acidity varying from 1 mg KOH/gm to 20 mg KOH/gm as determined by titration of samples against normal alcoholic KOH samples; and
wherein said oxide derivative of polymeric phosphate esters of polyisobutylene succinate ester is a reaction product of:
(a) reacting, in first step, a mixture consisting of polyisobutylene succinic anhydride [PIBSA] and a glycol while bubbling with nitrogen gas to produce hydroxy terminated polyisobutylene succinate ester having acid value of about 5 mg KOH/gm or less;
(b) reacting, in second step, the hydroxy terminated polyisobutylene succinate ester of the first step with phosphorus pentoxide ($P_2O_5$) while maintaining nitrogen gas blanket to produce said polymeric phosphate ester of polyisobutylene succinate ester;
(c) reacting, in third step, the polymeric phosphate esters of polyisobutylene succinate ester of the second step with oxirane compound to result in the oxide derivatives of polymeric phosphate ester of polyisobutylene succinate ester.

18. A naphthenic corrosion inhibitor as claimed in claim 17, wherein said oxirane compound is selected from ethylene oxide, propylene oxide and butylene oxide.

19. A method comprising using naphthenic acid corrosion inhibitor consisting of oxide derivative of polymeric phosphate ester of polyisobutylene succinate ester as claimed in claim 17 to inhibit naphthenic acid corrosion in crude oils, feedstocks, or hydrocarbon streams.

20. A naphthenic corrosion inhibitor as claimed in claim 17, wherein said inhibitor has phosphorus contents varying from 2% to 5% of the inhibitor.

21. A naphthenic corrosion inhibitor as claimed in claim 17, wherein said oxirane compound is selected from group consisting of ethylene oxide, propylene oxide and butylene oxide.

22. A naphthenic corrosion inhibitor as claimed in claim 17, wherein said oxirane compound is butylene oxide.

23. A naphthenic corrosion inhibitor as claimed in claim 17, wherein said oxirane compound is 1,2 butylene oxide.

24. A naphthenic corrosion inhibitor as claimed in claim 17, wherein said inhibitor has phosphorus contents varying from 1% to 5% of the inhibitor.

* * * * *